Nov. 1, 1960   F. H. GREEN   2,958,202
HIGH PRESSURE RATIO COOLING SYSTEM
Filed Nov. 21, 1956
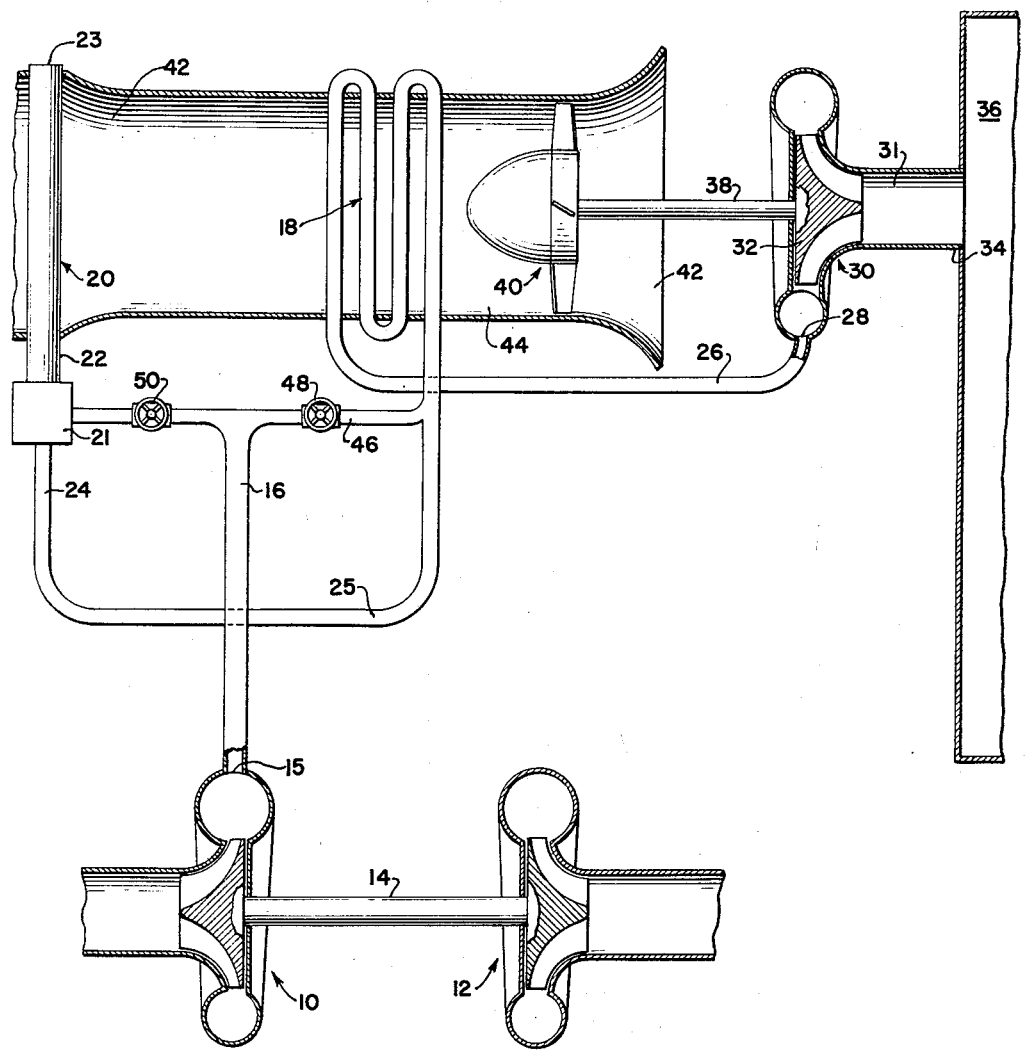
FREDERICK H. GREEN,
INVENTOR.
BY John H. G. Wallace

United States Patent Office 2,958,202
Patented Nov. 1, 1960

2,958,202

HIGH PRESSURE RATIO COOLING SYSTEM

Frederick H. Green, Palos Verdes Estates, Calif., assignor to The Garrett Corporation, Los Angeles, Calif., a corporation of California Filed Nov. 21, 1956, Ser. No. 623,754

10 Claims. (Cl. 62—5)

This invention pertains to expansion type cooling systems and more particularly to an expansion type cooling system having at least two means connected in series for expanding the gaseous fluid, at least one of which is a vortex tube.

In present high speed aircraft using jet engines, the bleed air available for cooling and pressurizing the aircraft cabin or other spaces in the aircraft is at an extremely high pressure compared with the pressure formerly available for this purpose. The term "bleed air" as used in this application, refers to compressed air which is withdrawn or bled from the compressor of an engine of an aircraft for use in the air conditioning system or for other purposes. The same problem of high bleed pressures also arises where low speed aircraft are refitted with more powerful engines. Bleed air having a high pressure creates several problems in an expansion type of cooling and pressurizing system, since present expansion turbines are designed to efficiently handle a maximum pressure ratio of approximately 10:1. Bleed air pressures presently available in high speed aircraft require pressure ratios of the order of 20:1 to 30:1. These pressure ratios make the designing of an efficient expansion turbine very difficult unless two such units are used in series. While one multistage turbine could be designed to handle these pressure ratios, its efficiency would be greatly reduced.

Other problems also arise in high speed aircraft, since the pressure of the bleed air available for cooling varies over a wide range and sometimes has an extremely high temperature. In systems using an expansion turbine having a fixed nozzle area, it is impossible to maintain a high efficiency in the expansion turbine with changes in the pressure and temperature of the bleed air. The high temperature of the bleed air also requires the use of stainless steel heat exchangers if presently designed expansion turbines are to be used in series. The necessity of using stainless steel heat exchangers, would in some cases add considerable weight to the over-all weight of the cooling system.

Accordingly, it is the principal object of this invention to provide a unique expansion type cooling system having at least two separate expansion devices, at least one of which is a vortex tube.

It is another object of this invention to provide an expansion type of cooling system having at least two separate expansion devices with a unique means for regulating the pressure of the bleed air supplied to the second expansion device so that a wide range of pressures may be handled.

It is another object of this invention to provide a unique design for an expansion type cooling system which eliminates the need for long high pressure supply lines to connect the expansion devices to the source of bleed air.

It is also another object of this invention to provide an expansion type cooling system having at least two expansion devices with a novel means for reducing the temperature of the bleed air before it is admitted to the second expansion means.

It is also another object of this invention to provide a unique design of expansion type cooling system using a vortex tube and an expansion turbine in series with the equivalent of two different nozzle areas for the expansion turbine.

These and other objects and advantages of this invention will be more easily understood by those skilled in the art from the following detailed description of a preferred embodiment when taken in conjunction with the attached drawing showing a schematic arrangement of this invention for cooling a space with the bleed air being supplied from the compressor of a jet engine.

The system shown in the drawing consists of a compressor unit 10 which supplies air to the combustion chamber of the jet engine and is driven by a turbine unit 12 of the jet engine by means of a shaft 14. Compressed air is bled from one of the later stages of the compressor 10 at a bleed tap 15 and is connected to the remainder of the system by means of a duct 16. While the pressure of the bleed air varies over a wide range it will have a pressure on the order of 300 inches of mercury absolute and a temperature on the order of 550° F. The pressure in the space 36 being cooled, on the other hand, is of the order of 15 inches of mercury absolute. Thus a pressure ratio of about 20:1 exists between the bleed air pressure and the pressure existing in space 36.

The bleed tap 15 is connected to the inlet chamber 21 of a vortex tube 20 by means of the duct 16 with the cold outlet 24 of the vortex tube 20 connected to the inlet side of a heat exchanger 18 by means of a duct 25. The heat exchanger 18 is mounted in a cooling duct 44 described below, by any desired means (not shown) and serves to further cool the air before it is admitted to the expansion turbine 30. The vortex tube 20 has a hot tube 22 extending upwardly from the vortex chamber 21 and a cold outlet pipe 24 extending in the opposite direction with the extreme end 23 of the hot tube 22 being closed by any desired means such as a cap or the like. The hot tube 22 extends up into the cooling duct 44 referred to above so that the exterior of the hot tube 22 will be cooled by the fluid flowing in the cooling duct. The vortex tube 20 referred to above is a device which when supplied with a stream of compressed gas, will divide the stream into a stream of high temperature gas which flows in the hot tube 22 and a stream of cooled gas which flows from the cold outlet 24. The vortex tube of this invention is similar in construction to the one disclosed in United States Patent No. 1,952,281 to G. J. Ranque. While the vortex tube of this invention is similar, it does differ in that the extreme end 23 of the hot tube 22 may be completely closed while the vortex tube of the Ranque patent shows the hot tube only partially closed. Even though the extreme end 23 of the hot tube 22 is completely closed, a stream of cold gas will still flow from the cold outlet 24. The quantity of gas flowing from the cold outlet 24 is thus equal to the quantity of gas admitted to the vortex chamber 21. If it is desired, the extreme end of the hot tube 22 may be only partially closed in which case a portion of the gas will escape as described in the Ranque patent. The cold outlet 24 of the vortex tube is connected by means of a suitable duct system 25 to the inlet side of the heat exchanger 18. The outlet of the heat exchanger 18 is connected to the expansion turbine inlet 28 by means of a duct 26. From inlet 28 the pressurized air flows over the blades of the turbine wheel 32 where it is expanded and reduced in pressure and temperature. The discharge 31 of the expansion turbine 30 is connected to the space 36 which is to be cooled by means of a duct system 34. The space 36 may be the cabin of an aircraft or any other space which it is desired to cool and/or pressurize.

The end of the expansion turbine 30 opposite the discharge 31 is connected to a suitable fluid propelling means 40 by means of a shaft 38. The fluid propelling means 40 draws the surrounding atmosphere as a coolant in through an annular opening 42 and propels it axially through a cooling duct system 44. The cooling duct system 44 conducts the fluid of the surrounding atmosphere over the hot tube 22 of the vortex tube and the heat exchanger 18 and then discharges it back to the atmosphere. For a more detailed description of the expansion turbine 30 and fluid propelling means 40 referred to above, reference is made to United States Patent No. 2,492,672, dated December 27, 1949, to H. J. Wood, entitled "Turbine Driven Fluid Circulating System."

A by-pass duct 46 connects the duct 16 directly to the heat exchanger 18 so that the vortex tube 20 may be by-passed if it is so desired. A valve 48 is mounted in the duct 46 in order to control the quantity of air flowing in the by-pass duct 46. A valve 50 is mounted in the duct 16 which connects the bleed tap 15 to the inlet chamber 21 of the vortex tube in order to control the air flow to the vortex tube 20. This arrangement of valves 48 and 50 thus allows the by-passing of a portion of the bleed air directly to the heat exchanger 18 while conducting the remainder of the bleed air through the vortex tube 20, or complete by-passing of the vortex tube. The valves 48 and 50 may be electrically operated valves and remotely controlled by any desired type of sensing means so that a properly controlled flow of bleed air is supplied to both the vortex tube and the heat exchanger in accordance with preselected conditions. In cases where it is desired to save additional weight, valve 50 may be eliminated and valve 48 used as the sole means of control.

At low speeds when the pressure of the bleed air is low it may be desirable to completely by-pass the vortex tube 20; at high speeds, substantially all of the bleed air would flow through the vortex tube. The above described means for controlling the amount of bleed air which is admitted to the vortex tube 20 provides the effect of a means for controlling the nozzle area of the expansion turbine 30. The bleed air flow to the vortex tube 20 can be controlled from zero to a maximum air flow so that the expansion turbine will be supplied with an air flow which varies over a relatively narrow pressure range. Thus, the expansion turbine 30 will operate at near its maximum efficiency for all speeds of the aircraft.

The above system thus supplies a means whereby the high pressure bleed air from the compressor 10 may be expanded over a pressure ratio on the order of 20:1 to 30:1 and supplied to a space 36 which is to be cooled and/or pressurized. The use of the vortex tube 20 as the first stage in the expansion system allows the operation of the expansion turbine at near its maximum adiabatic efficiency and thus increases the over-all efficiency of the unit. The vortex tube also acts as a heat exchanger in precooling the air before it is supplied to the heat exchanger 18, thus allowing the use of aluminum heat exchangers instead of stainless steel heat exchangers which results in a saving in weight. In some applications the heat exchanger 18 could be completely omitted, thus the vortex tube would act as the sole heat exchanger.

This system also mounts both the vortex tube and expansion turbine in a common duct system which connects the bleed tap 15 with the space 36 which is being cooled. The part of the duct system 25 which connects the outlet of the vortex tube 20 with inlet to the heat exchanger 18 is subject to relatively low pressures. Thus, if the vortex tube 20 is mounted near the bleed tap 15, no long ducts which are subject to high pressures will be required to connect the various elements of the system. Of course, the valve 48 will be subject to high pressure but the remainder of the system will be subject to a relatively low pressure.

The above system can also be applied to existing aircraft which are equipped with engines having increased power since the presently installed expansion turbine and fluid circulating means can be retained, and all that is necessary is to add the vortex tube 20 to the system and necessary valve. In this case, the vortex tube 20 would act as the first stage of the expansion system and reduce the pressure of the bleed air to approximately the same pressure as the pressure of the bleed air previously supplied to the expansion turbine when the aircraft was equipped with low pressure ratio engines. The use of a vortex tube as the first stage of the system would result in a great saving in weight over that possible if two expansion turbines were used in series.

Accordingly, while but one preferred embodiment of this invention has been described in detail, it will be apparent to those skilled in the art that other embodiments are possible and may be desirable within the spirit and scope of the invention.

I claim:

1. An expansion cooling system for cooling a space comprising: a source of pressurized elastic fluid; a duct system connecting said source to said space; at least two separate expansion means mounted in said duct; at least one of said expansion means consisting of a vortex tube having an inlet, a hot tube, and a cold outlet; duct means for connecting said inlet and said cold outlet to said duct system; and means driven by one of said expansion means for cooling the exterior of said hot tube.

2. An expansion cooling system for cooling a space comprising: a source of pressurized elastic fluid; a duct system connecting said source to said space; at least two separate expansion means mounted in said duct; at least one of said expansion means consisting of a vortex tube having an inlet, a closed end hot tube, and a cold outlet; duct means for connecting said inlet and said cold outlet to said duct system, and means driven by one of said expansion means for cooling the exterior of said hot tube.

3. A high pressure ratio expansion type space cooling system comprising: a source of high pressure gas; a duct system connecting said source to said space; at least two expansion means mounted in said duct system; the first of said expansion means consisting of a vortex tube having an inlet, a closed end hot tube, and a cold outlet pipe; said source being connected to said inlet and said cold outlet being connected to a second expansion means; said second expansion means driving a fluid propelling means; said propelling means being adapted to circulate the fluid surrounding the cooling system over the exterior of the hot tube of said vortex tube.

4. A high pressure ratio expansion type space cooling system comprising: a source of high pressure gas; a duct system connecting said source to said space; at least two expansion means mounted in said duct system; the first of said expansion means consisting of a vortex tube having an inlet, a hot tube, and a cold outlet pipe, the second of said expansion means consisting of an expansion turbine; said source being connected to said inlet and said cold outlet being connected to said expansion turbine; and means connected to said duct system for by-passing said vortex tube.

5. A high pressure ratio expansion type space cooling system comprising: a source of high pressure gas; a duct system connecting said source to said space; at least two expansion means mounted in said duct system; the first of said expansion means consisting of a vortex tube having an inlet, hot tube and a cold outlet pipe; said source being connected to said inlet and said cold outlet being connected to a second expansion means; said second expansion means driving a fluid propelling means; said propelling means being adapted to circulate the fluid surrounding the cooling system over the exterior of the hot tube of said vortex tube; and means connected to said duct system for by-passing said vortex tube.

6. An expansion type space cooling system comprising: a source of high pressure gas; a vortex tube having an inlet, hot tube and a cold outlet pipe; said inlet being connected to said source and said cold outlet being connected to an expansion turbine; the discharge of said turbine being connected to said space; said turbine driving means for propelling the fluid surrounding said system over the exterior surface of the hot tube of said vortex tube.

7. An expansion type space cooling system comprising: a source of pressurized gas; a vortex tube and an expansion turbine connected in series, said source being connected to the inlet of said vortex tube, the outlet of said vortex tube being connected to the inlet of said expansion turbine through a heat exchanger, the outlet of said turbine being connected to said space, said turbine driving fluid circulating means for circulating the fluid surrounding said system; and means associated with said fluid circulating means for directing said circulated fluid over said heat exchanger and the hot tube of said vortex tube.

8. A cooling system for an enclosure comprising: a source of high pressure fluid; an expansion means having an inlet connected with said pressure source and an outlet leading to said enclosure; a vortex tube having an inlet communicating with said pressure source and a cold outlet connected with the inlet of said expansion means; and valve means adapted to proportion the flow of pressurized fluid from the source between the inlet of the said vortex tube and the inlet of the said expansion means to maintain the pressure of the fluid at the inlet of the expansion means substantially constant.

9. A cooling system for an enclosure comprising: a source of high pressure fluid; a vortex tube and an expansion turbine connected in series, said source being connected to the inlet of said vortex tube, the outlet of said vortex tube being connected to the inlet of said expansion turbine, the outlet of said turbine being connected to said enclosure; and means for conducting a portion of said high pressure fluid directly from said source to the inlet of said expansion turbine to maintain the pressure of the fluid at the turbine inlet substantially constant.

10. A cooling system for an enclosure comprising: a source of high pressure fluid; a vortex tube, a heat exchanger and an expansion turbine connected in series, said source being connected to the inlet of said vortex tube, the outlet of said vortex tube being connected to the inlet of asid heat exchanger, the outlet of said heat exchanger being connected to the inlet of said expansion turbine, and the outlet of said turbine being connected to said enclosure; and means for conducting a portion of said high pressure fluid directly from said source to the inlet of said heat exchanger to maintain the pressure of the fluid at the turbine inlet substantially constant.

References Cited in the file of this patent

UNITED STATES PATENTS

| | | |
|---|---|---|
| 2,691,274 | Whitney | Oct. 12, 1954 |
| 2,782,613 | Addie | Feb. 26, 1957 |
| 2,786,341 | Green | Mar. 26, 1957 |
| 2,819,590 | Green | Jan. 14, 1958 |

FOREIGN PATENTS

| | | |
|---|---|---|
| 276,405 | Switzerland | Oct. 1, 1951 |